US007027397B1

(12) United States Patent
Turner et al.

(10) Patent No.: US 7,027,397 B1
(45) Date of Patent: *Apr. 11, 2006

(54) METHOD AND APPARATUS FOR ACCUMULATING AND DISTRIBUTING TRAFFIC AND FLOW CONTROL INFORMATION IN A PACKET SWITCHING SYSTEM

(75) Inventors: Jonathan S. Turner, St. Louis, MO (US); Zubin D. Dittia, Sunnyvale, CA (US); Thomas Dejanovic, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 859 days.

This patent is subject to a terminal disclaimer.

(21) Appl. No.: 09/784,787

(22) Filed: Feb. 15, 2001

(51) Int. Cl.
*H04L 12/26* (2006.01)
(52) U.S. Cl. ........................................ 370/235; 370/229
(58) Field of Classification Search ........ 370/229–235, 370/236, 236.1, 237, 395.1, 252, 412, 428, 370/429, 351, 396, 395.2–395.43, 400, 468; 709/229, 234, 235
See application file for complete search history.

(56) References Cited

U.S. PATENT DOCUMENTS

| | | | |
|---|---|---|---|
| 4,491,945 A | 1/1985 | Turner | |
| 4,494,230 A | 1/1985 | Turner | |
| 4,630,259 A | 12/1986 | Larson et al. | |
| 4,630,260 A | 12/1986 | Toy et al. | |
| 4,734,907 A | 3/1988 | Turner | |
| 4,745,593 A | 5/1988 | Stewart | |
| 4,829,227 A | 5/1989 | Turner | |
| 4,849,968 A | 7/1989 | Turner | |
| 4,893,304 A | 1/1990 | Giacopelli et al. | |
| 4,901,309 A | 2/1990 | Turner | |
| 5,027,342 A | 6/1991 | Boulton et al. | |
| 5,127,000 A | 6/1992 | Henrion | |
| 5,161,156 A | 11/1992 | Baum et al. | |
| 5,173,897 A | 12/1992 | Schrodi et al. | |
| 5,179,551 A | 1/1993 | Turner | |
| 5,179,556 A | 1/1993 | Turner | |
| 5,229,990 A | 7/1993 | Teraslinna | |
| 5,229,991 A | 7/1993 | Turner | |

(Continued)

OTHER PUBLICATIONS

Jonathan S. Turner, "An Optimal Nonblocking Multicast Virtual Circuit Switch," Jun. 1994, Proceedings of Infocom, 8 pages.

(Continued)

*Primary Examiner*—Ajit Patel
(74) *Attorney, Agent, or Firm*—The Law Office of Kirk D. Williams

(57) ABSTRACT

Methods and apparatus are disclosed for accumulating traffic information and distributing flow control information in a packet switching system. Traffic information is collected in multiple elements and indications of congestion and/or other types of information useful in determining traffic conditions are forwarded to collecting elements. The collecting elements manipulate the received indications and generate flow control messages which are sent to individual sending components. In one implementation, a switching element maintains for each destination a count of packets within itself which are addressed to the particular destination. Indications of this collected information are sent to collecting switching elements. These collecting elements accumulate the information received from multiple sources. The accumulated information is evaluated, and when a congestion condition is located or anticipated, then flow control messages are distributed to all, or a subset of, the packet sources.

25 Claims, 14 Drawing Sheets

U.S. PATENT DOCUMENTS

| | | | |
|---|---|---|---|
| 5,253,251 A | 10/1993 | Aramaki | |
| 5,260,935 A | 11/1993 | Turner | |
| 5,265,092 A | 11/1993 | Soloway et al. | |
| 5,339,311 A | 8/1994 | Turner | |
| 5,402,415 A | 3/1995 | Turner | |
| 5,471,460 A | 11/1995 | Tanabe | |
| 5,475,682 A * | 12/1995 | Choudhury et al. | 370/229 |
| 5,533,020 A | 7/1996 | Byrn et al. | |
| 5,689,500 A | 11/1997 | Chiussi et al. | |
| 5,768,572 A | 6/1998 | George et al. | |
| 5,842,040 A | 11/1998 | Hughes et al. | |
| 5,844,890 A | 12/1998 | Delp et al. | |
| 5,848,227 A | 12/1998 | Sheu | |
| 6,246,665 B1 | 6/2001 | Watanabe et al. | |
| 6,343,067 B1 | 1/2002 | Drottar et al. | |
| 6,366,557 B1 | 4/2002 | Hunter | |
| 6,411,599 B1 | 6/2002 | Blanc et al. | |
| 6,418,115 B1 | 7/2002 | Iino et al. | |
| 6,424,624 B1 | 7/2002 | Galand et al. | |
| 6,430,150 B1 | 8/2002 | Azuma et al. | |
| 6,654,342 B1 * | 11/2003 | Dittia et al. | 370/229 |
| 6,674,721 B1 | 1/2004 | Ditia et al. | |
| 6,728,211 B1 * | 4/2004 | Peris et al. | 370/235 |
| 6,735,173 B1 * | 5/2004 | Lenoski et al. | 370/235 |
| 6,747,972 B1 | 6/2004 | Lenoski et al. | |
| 6,788,689 B1 | 9/2004 | Turner et al. | |
| 6,816,492 B1 | 11/2004 | Turner et al. | |
| 6,826,186 B1 | 11/2004 | Dittia et al. | |

OTHER PUBLICATIONS

Chaney et al., "Design of a Gigabit ATM Switch," Feb. 5, 1996, WUCS-96-07, Washington University, St. Louis, MO, 20 pages.

Turner et al., "System Architecture Document for Gigabit Switching Technology," Aug. 27, 1998, Ver. 3.5, ARL-94-11, Washington University, St. Louis, MO, 110 pages.

U.S. Appl. No. 09/519,282, filed Mar. 7, 2000, Lenoski et al.

U.S. Appl. No. 09/705,450, filed Nov. 2, 2000, Turner et al.

U.S. Appl. No. 09/705,395, filed Nov. 2, 2000, Turner et al.

* cited by examiner

METHOD AND APPARATUS FOR ACCUMULATING AND DISTRIBUTING TRAFFIC AND FLOW CONTROL INFORMATION IN A PACKET SWITCHING SYSTEM

FIELD OF THE INVENTION

This invention relates to collecting and distributing traffic and flow control information in a packet switching system; and more particularly, the invention relates to collecting and accumulating traffic information in packet switch components and propagating flow control messages based on the accumulated information.

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

As used herein, the term "packet" refers to packets of all types, including, but not limited to, fixed length cells and variable length packets. Moreover, these packets may contain one or more types of information, including, but not limited to, voice, data, video, and audio information. Furthermore, the term "system" is used generically herein to describe any number of components, packet switch elements, packet switches, networks, computer and/or communication devices or mechanisms, or combinations thereof.

Consumers and designers of these systems typically desire high reliability and increased performance at a reasonable price. A commonly used technique for helping to achieve this goal is for these systems to provide multiple paths between a source and a destination. Packets of information are then dynamically routed and distributed among these multiple paths. It is typically more cost-effective to provide multiple slower rate links or switching paths, than to provide a single higher rate path. Such designs also achieve other desired performance characteristics.

Under certain circumstances and typically for a limited duration, these switching systems can have internal congestion as well as congestion at the output ports. The amount of the congestion can be decreased if the traffic sources stop or decrease sending packets for a period of time over the congested paths or to the congested output ports. However, to react to such congestion and to decrease or stop sending such information, these traffic sources (e.g., sending ports, line cards, etc.) must be notified to stop or decrease their sending of packets by some element recognizing the congestion.

In a conventional, directly connected point-to-point application, a receiver will throttle a sender by communicating flow control information directly to the sender (e.g., XOFF, XON etc.). In this example, the receiver has full information and can know when to stop, slow down, speed up, or resume the sending of traffic between the sender and receiver. However, when a packet switch is interposed between a sender and receiver, the receiver may no longer have the complete and timely information necessary to make such flow control decisions, especially when the congestion is within the interposed packet switch. This problem of identifying congestion is compounded when packets belonging to the same information stream are distributed among multiple paths and switching elements within the packet switching system. In this scenario, no single element inherently has the information necessary to timely react to congestion.

New methods and apparatus are needed to efficiently recognize actual and potential congestion situations within a packet switching system and to communicate appropriate flow control information to sending elements or devices.

SUMMARY OF THE INVENTION

A method is disclosed for collecting traffic information within a packet switching system and determining a set of traffic conditions. In one embodiment, each of multiple first elements of a packet switching system collect information representing approximately a volume of traffic contained within the particular said first element. Each of the multiple first elements transmits an indication of a subset of the collected information to a second element of the packet switching system. The second element receives the transmitted indications from one or more of the plurality of first elements and manipulates the received indications to determine a set of traffic conditions.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1A:
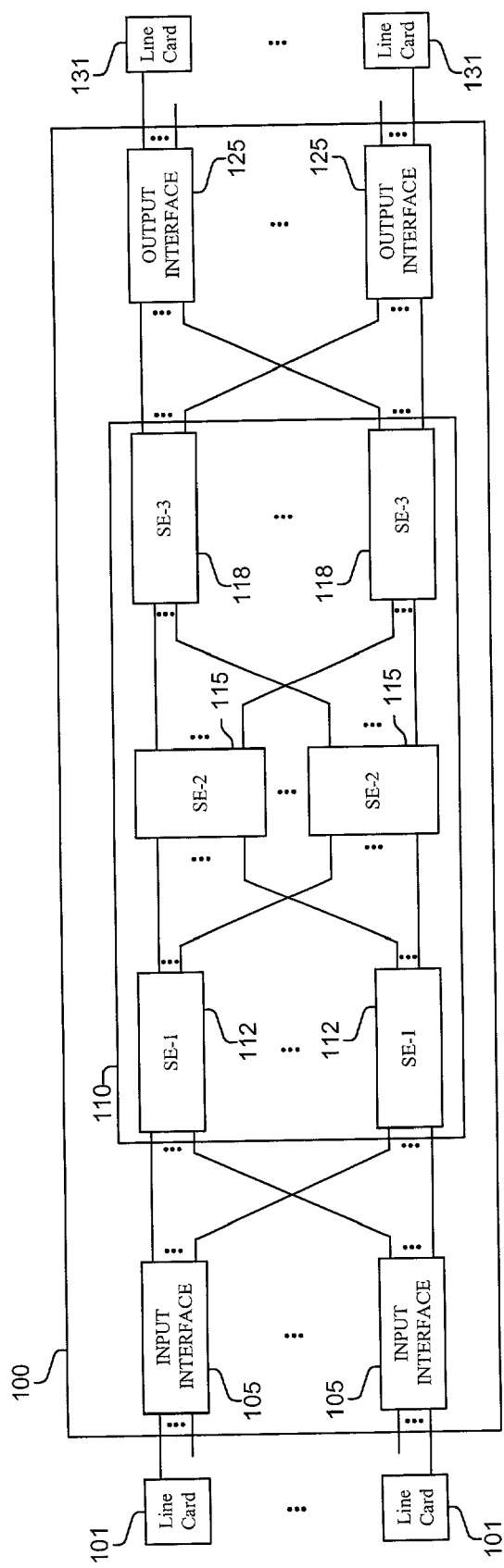
FIGS. 1A–C are block diagrams of a few of many possible embodiments of a switching system.

Methods and apparatus are disclosed for accumulating and distributing traffic and flow control information in a packet switching system. Such methods and apparatus are not limited to a single packet switching environment. Rather, the architecture and functionality taught herein are extensible to an unlimited number of packet switching environments and embodiments in keeping with the scope and spirit of the invention. Embodiments described herein include various elements and limitations, with no one element or limitation contemplated as being a critical element or limitation. Each of the claims individually recite an aspect of the invention in its entirety. Moreover, some embodiments described may include, inter alia, systems, integrated circuit chips, methods, and computer-readable medium containing instructions. The embodiments described hereinafter embody various aspects and configurations within the scope and spirit of the invention.

Accumulating and Distributing Flow Control Information

Methods and apparatus are disclosed for accumulating traffic information and distributing flow control information in a packet switching system. Traffic information is collected in multiple elements of the packet switching system. These multiple elements forward to collecting elements of the packet switching system indications of congestion and/or other types of information useful in determining traffic conditions within the packet switching system. The collecting elements manipulate the received indications of traffic conditions and generate flow control messages which are sent to individual sending components (e.g., I/O interfaces, line cards, ports, etc.) of the packet switching system.

In one embodiment, a switching element maintains for each destination a count of packets within itself which are addressed to the particular destination. Indications of this collected information are sent to all, or a subset of, the collecting switching elements of the packet switching system. These collecting elements accumulate the information received from multiple sources. The accumulated information is evaluated, and when a congestion condition is determined or anticipated, then flow control messages are distributed to all, or a subset of, the packet sources (e.g., I/O interfaces, line cards, ports, etc.).

In one embodiment, information is collected by a tabulator in each of the distribution switching elements of a switching fabric. For example, in one embodiment of a three stage switching fabric, a tabulator in each of the second stage switching elements maintains a tabulation data structure of packet counts corresponding to approximately to the number of packets currently within the particular switching element. Periodically or asynchronously, update information is sent from these tabulators to accumulators in one or more of the third stage switching elements. The accumulators then accumulate and manipulate the received traffic information and distribute flow control information to one or more components (e.g., I/O interfaces, line cards, ports, etc.) which can react to lessen the actual, perceived, or anticipated congestion or other traffic conditions. Traffic and flow control information may be sent using at least one of many different techniques such as in messages, over control lines, piggybacked in other data or control messages, etc.

Details of Exemplary Embodiments

FIGS. 1A–3C and their discussion herein are intended to provide a description of various exemplary packet switching systems. FIGS. 1A–C illustrate the basic topology of different exemplary packet switching systems. FIG. 1A illustrates an exemplary packet switch 100 having multiple inputs and outputs and a single interconnection network 110. FIG. 1B illustrates an exemplary packet switch 140 having multiple interconnection networks 141 and folded input and output interfaces 149. FIG. 1C illustrates an exemplary folded packet switch 160 having multiple interconnection networks 161 and folded input and output interfaces 169. Embodiments of each of these packet switches 100, 140 and 160 receive, generate, accumulate, distribute, and react to flow control information in the manners disclosed herein. Of course, the invention is not limited to these illustrated operating environments and embodiments, and the packet switching systems may have more or less elements.

FIG. 1A illustrates an exemplary embodiment of a packet switch 100. Packet switch 100 comprises multiple input interfaces 105, interconnection network 110, and output interfaces 125. Input interfaces 105 and output interfaces 125 are both coupled over multiple links to interconnection network 110. Line cards 101 and 131 are coupled to input interfaces 105 and output interfaces 131. In certain embodiments including other packet switching topologies, line cards or their functionality may be included in the packet switch itself, or as part of the packet switching system.

In one embodiment, interconnection network 110 comprises multiple switch elements SE-1 112, SE-2 115, and SE-3 118 that are interconnected by multiple links. Line cards 101 and 131 may connect to other systems (not shown) to provide data items (e.g., packets) to be routed by packet switch 100. Flow control information may be generated, consumed, or processed at one or more of the line cards 101, 131, input interfaces 105, switch elements SE-1 112, SE-2 115, and SE-3 118, output interfaces 125, and/or other locations within packet switch 100 or the packet switching system.

Figure 1B:
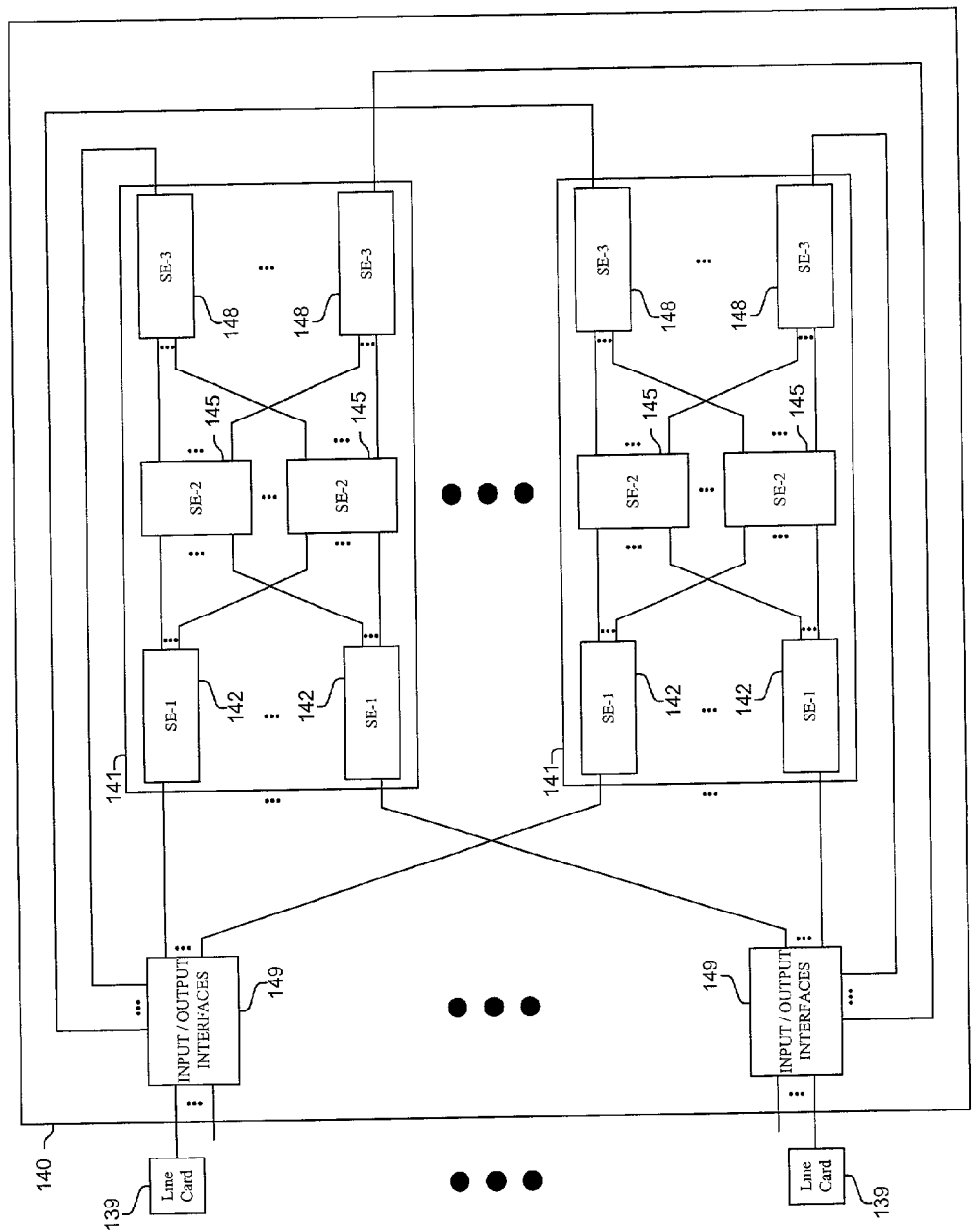

FIG. 1B illustrates another exemplary operating environment and embodiment of a packet switch 140. Packet switch 140 comprises multiple folded input and output interfaces 149 interconnected over multiple links to interconnection networks 141, which are interconnected over multiple links returning to input and output interfaces 149. In one embodiment, interconnection networks 141 comprise multiple switch elements SE-1 142, SE-2 145, and SE-3 148 also interconnected by multiple links. Interfaces 149 may connect via bi-directional links to line cards 139 that connect with other systems (not shown) to provide data items (e.g., packets) to be routed by packet switch 140. Flow control information may be generated, consumed, or processed at one or more of the line cards 139, input and output interfaces 149, switch elements SE-1 142, SE-2 145, and SE-3 148, and/or other locations within packet switch 140 or the packet switching system.

Figure 1C:
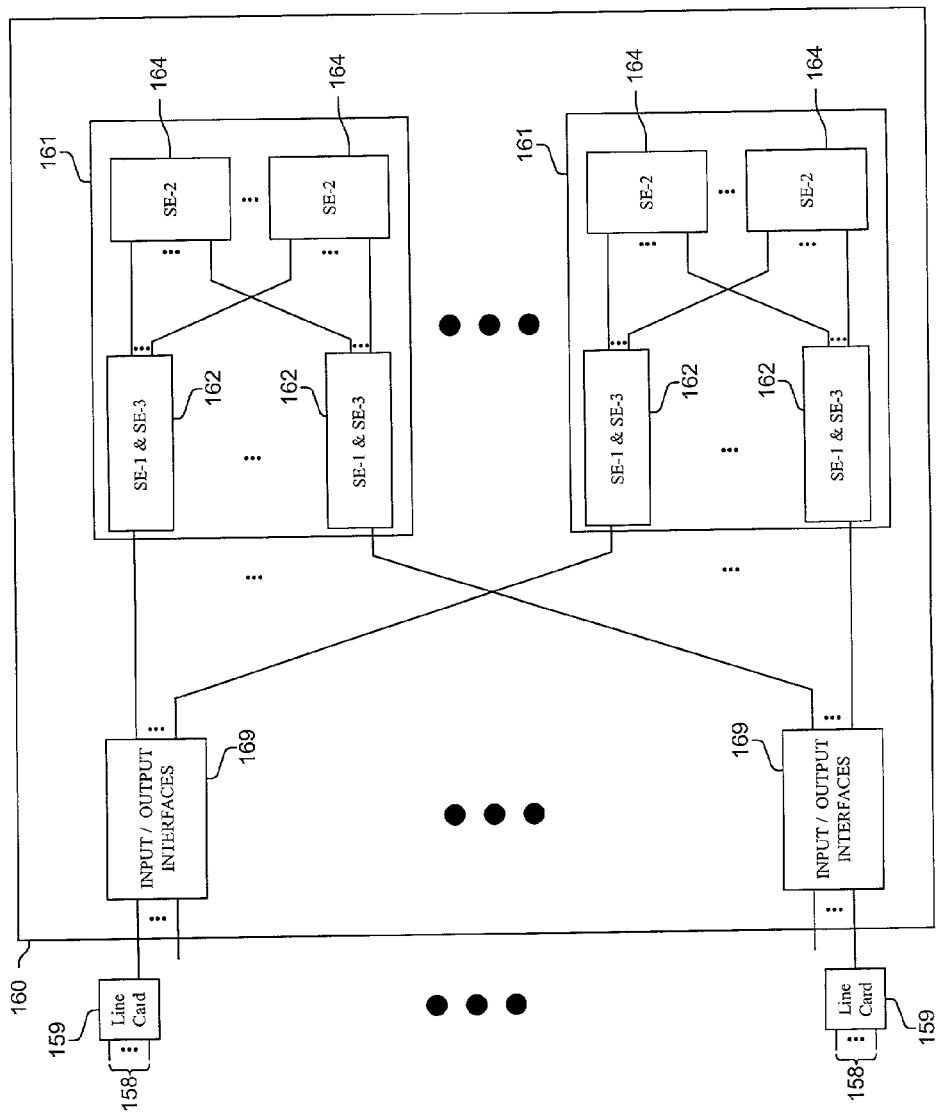

FIG. 1C illustrates another exemplary operating environment and embodiment of a packet switch 160. Packet switch 160 has a folded network topology. Packet switch 160 comprises multiple folded input and output interfaces 169 interconnected over multiple links to interconnection networks 161, which are interconnected over multiple links returning to interfaces 169. In one embodiment, interconnection networks 161 comprise multiple switch elements SE-1 & SE-3 162 and SE-2 164 also interconnected by multiple links. Interfaces 169 may connect via bi-directional links to line cards 159 which connect via ports 158 to other systems (not shown) to provide data items to be routed by packet switch 160. Flow control information may be generated, consumed, or processed at one or more of the line cards 159, input and output interfaces 169, switch elements SE-1 & SE-3 162 and SE-2 164, and/or other locations within packet switch 160 or the packet switching system.

Figure 2A:
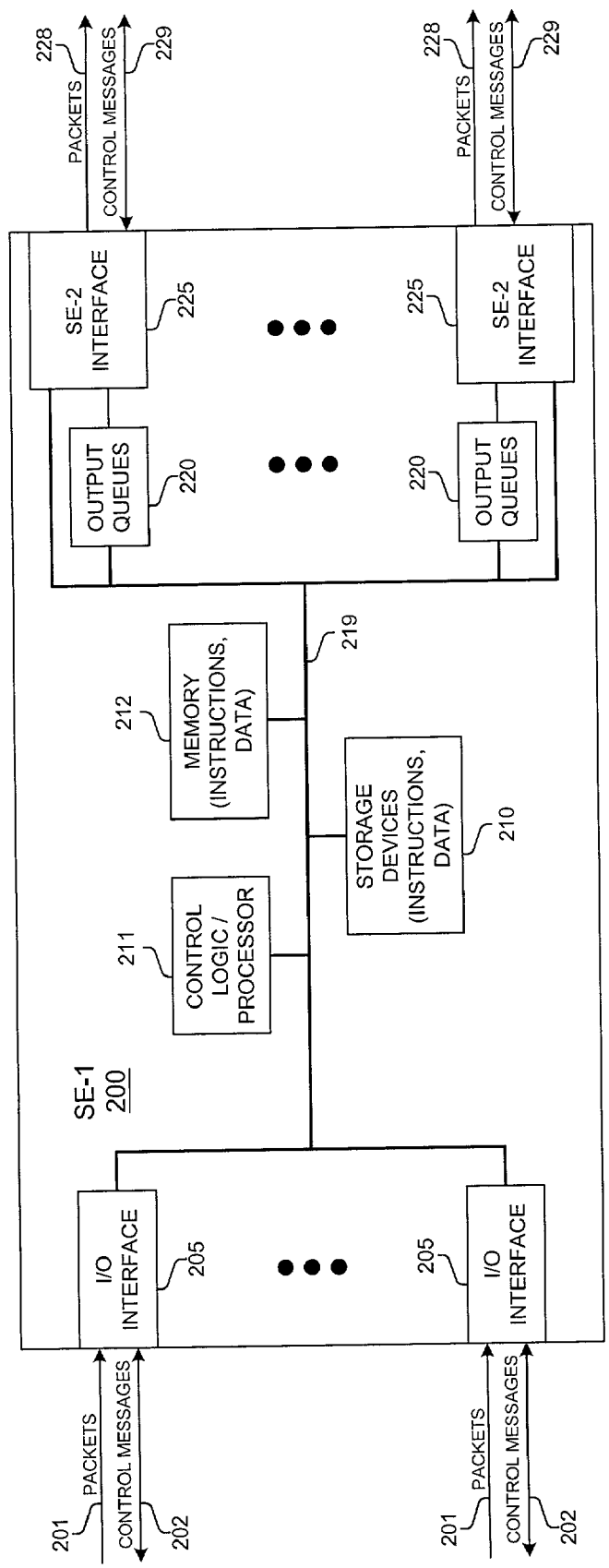
FIGS. 2A–C are block diagrams of exemplary switching fabric components.
Figure 2B:
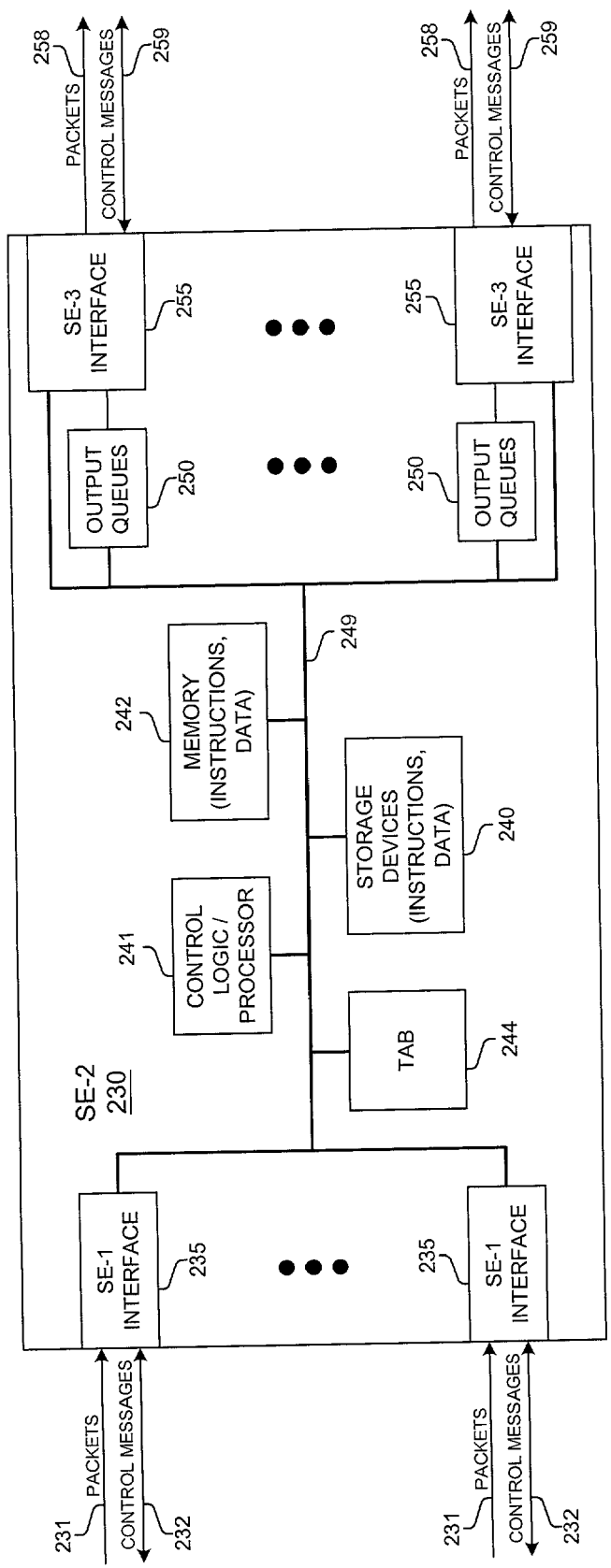
Figure 2C:
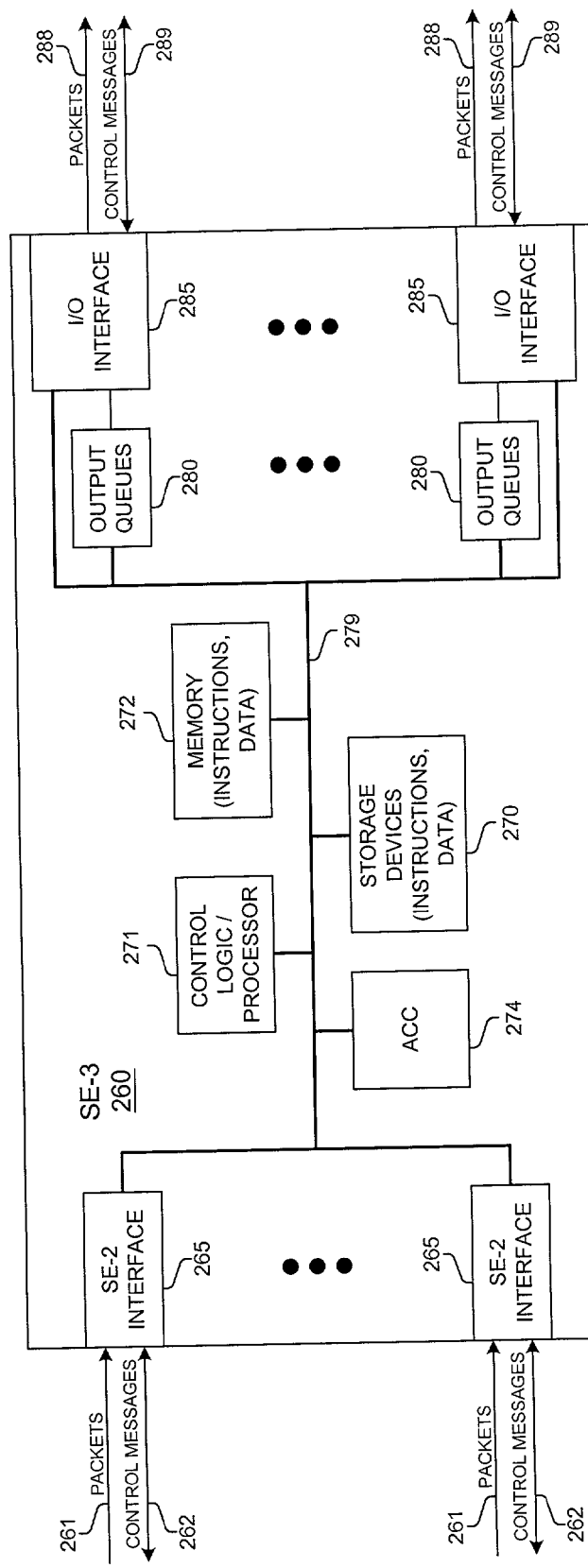

FIGS. 2A–C illustrate exemplary embodiments of switching elements and/or their components in accordance with certain embodiments of the invention. FIG. 2A is a block diagram of a first stage switching element, SE-1 200. FIG. 213 is a block diagram of a second stage switching element SE-2 230. FIG. 2C is a block diagram of a third stage switching element SE-3 260. The invention is not limited to these or any other embodiment described herein. Rather, the invention as described herein is extensible to an unlimited number of embodiments and implementations as would be understood by one skilled in the art.

FIG. 2A illustrates an embodiment of SE-1 200 comprising control logic and/or processor 211 (hereinafter "control logic"), memory 212, storage devices 210, I/O interfaces 205, output queues 220, SE-2 interfaces 225, and one or more internal communications mechanisms 219 (shown as a bus for illustrative purposes). In certain embodiments, control logic 211 comprises custom control circuitry for controlling the operation of SE-1 200. Memory 212 is one type of computer-readable medium, and typically comprises random access memory (RAM), read only memory (ROM), integrated circuits, and/or other memory components. Memory 212 typically stores computer-executable instructions to be executed by control logic 211 and/or data which is manipulated by control logic 211 for implementing functionality in accordance with certain embodiments of the invention. Storage devices 210 are another type of computer-readable medium, and typically comprise disk drives, diskettes, networked services, tape drives, and other storage devices. Storage devices 210 typically store computer-executable instructions to be executed by control logic 211 and/or data which is manipulated by control logic 211 for implementing functionality in accordance with certain embodiments of the invention.

Each SE-1 200 receives packets 201 and exchanges control messages 202 over one or more links with one or more input interfaces (not shown) such as input/output interface 285 (FIG. 2C) via I/O interfaces 205. In other embodiments, data packets and control messages are transmitted over a common link or links, and/or communication interfaces have a folded topology. Additionally, each SE-1 200 sends packets 228 and exchanges control messages 229 over one or more links with one or more SE-2 elements (not shown) such as SE-2 230 (FIG. 2B) via SE-2 interfaces 225. Outgoing packets and control messages are placed in output queues 220. Depending on the embodiment, there is an output queue 220 for each destination, for each class of service for each destination, for each next stage switching element, for each class of service for each next stage switching element, or one of many other possible configurations.

FIG. 2B illustrates an embodiment of SE-2 230 comprising control logic and/or processor 241 (hereinafter "control logic"), memory 242, storage devices 240, tabulator (TAB) 244, SE-1 interfaces 235, output queues 250, SE-3 interfaces 255, and one or more internal communications mechanisms 249 (shown as a bus for illustrative purposes). In certain embodiments, control logic 241 comprises custom control circuitry for controlling the operation of SE-2 230. Memory 242 is one type of computer-readable medium, and typically comprises random access memory (RAM), read only memory (ROM), integrated circuits, and/or other memory components. Memory 242 typically stores computer-executable instructions to be executed by control logic 241 and/or data which is manipulated by control logic 241 for implementing functionality in accordance with certain embodiments of the invention. Storage devices 240 are another type of computer-readable medium, and typically comprise disk drives, diskettes, networked services, tape drives, and other storage devices. Storage devices 240 typically store computer-executable instructions to be executed by control logic 241 and/or data which is manipulated by control logic 241 for implementing functionality in accordance with certain embodiments of the invention.

SE-2 230 generates, consumes, processes and reacts to collected traffic and flow control information. Each SE-2 230 receives packets 231 and exchanges control messages 232 over one or more links with one or more SE-1 elements (not shown) such as SE-1 200 (FIG. 2A) via SE-1 interfaces 235. In other embodiments, data packets and control messages are transmitted over a common link or links, and/or communication interfaces have a folded topology. For example, the communications functions of SE-1 interface 235 and SE-3 interface 255 could be combined, which is particularly useful in an embodiment where SE-1 200 (FIG. 2A) and SE-3 260 (FIG. 2C) are implemented on a single component. (e.g., chip or circuit board). Additionally, each SE-2 230 sends packets 258 and exchanges control messages 259 over one or more links with one or more SE-3 elements (not shown) such as SE-3 260 (FIG. 2C) via SE-3 interfaces 255. In one embodiment using a folded topology, the links between (a) SE-2 230 and SE-1 200 and (b) SE-2 230 and SE-3 260 are the same links. Control logic 241 receives control packets containing flow control information, and updates its flow control data structure stored in memory 242. Additionally, tabulator 244 receives and accumulates traffic and/or flow control information. The functionality of tabulator 244 could also be performed by control logic 241 using memory 242. SE-2 230 typically distributes traffic and/or flow control information to other packet switching components by sending control messages 232 and 259 as well as "piggybacking" or including traffic and/or flow control information in reserved fields of other control messages 232 and 259 (e.g., acknowledgment or clear-to-send control messages) or data packets 258 being sent. Outgoing packets 258 and control messages 259 are placed in output queues 250. Depending on the embodiment, there is an output queue 250 for each destination, for each class of service for each destination, for each next stage switching element, for each class of service for each next stage switching element, or one of many other possible configurations.

FIG. 2C illustrates an embodiment of SE-3 260 comprising control logic and/or processor 271 (hereinafter "control logic"), memory 272, storage devices 270, accumulator 274, SE-2 interfaces 265, output queues 280, I/O interfaces 285, and one or more internal communications mechanisms 279 (shown as a bus for illustrative purposes). In certain embodiments, control logic 271 comprises custom control circuitry for controlling the operation of SE-3 260. Memory 272 is one type of computer-readable medium, and typically comprises random access memory (RAM), read only memory (ROM), integrated circuits, and/or other memory components. Memory 272 typically stores computer-executable instructions to be executed by control logic 271 and/or data which is manipulated by control logic 271 for implementing functionality in accordance with certain embodiments of the invention. Storage devices 270 are another type of computer-readable medium, and typically comprise disk drives, diskettes, networked services, tape drives, and other storage devices. Storage devices 270 typically store computer-executable instructions to be executed by control logic 271 and/or data which is manipulated by control logic 271 for implementing functionality in accordance with certain embodiments of the invention.

Accumulator 274 collects traffic information received from tabulators 244 (FIG. 2B), and accumulates this received traffic information in a data structure. This accumulated information is periodically or asynchronously manipulated to determine actual, perceived or anticipated traffic conditions. Flow control information can then be sent to packet sources to slow down or stop sending traffic until the congestion condition no longer exists.

SE-3 260 generates, consumes, processes and reacts to traffic and/or flow control information as further described in detail hereinafter. Briefly first, each SE-3 260 receives packets 261 and exchanges control messages 262 over one or more links with one or more SE-2 elements (not shown) such as SE-2 230 (FIG. 2B) via SE-2 interfaces 265. In other embodiments, data packets and control messages are transmitted over a common link or links, and/or communication interfaces have a folded topology. Additionally, SE-3 260 sends packets 288 and exchanges control messages 289 over one or more links with one or more output interface elements (not shown) such as Input/Output interface 285 (FIG. 2C) via I/O interfaces 285. Control logic 271 receives control packets containing traffic and/or flow control information, and updates its flow control data structure stored in memory 272. SE-3 260 typically distributes traffic and/or flow control information to other packet switching components by sending control messages 262 and 289 as well as "piggybacking" or including traffic and/or flow control information in reserved fields of other control messages 262 and 289 (e.g., acknowledgment or clear-to-send control messages) or data packets 288 being sent. Outgoing packets 288 and control messages 289 are placed in output queues 280. Depending on the embodiment, there is an output queue 280 for each destination, for each class of service for each destination, for each next stage switching element, for each class of service for each next stage switching element, or one of many other possible configurations.

Figure 3A:
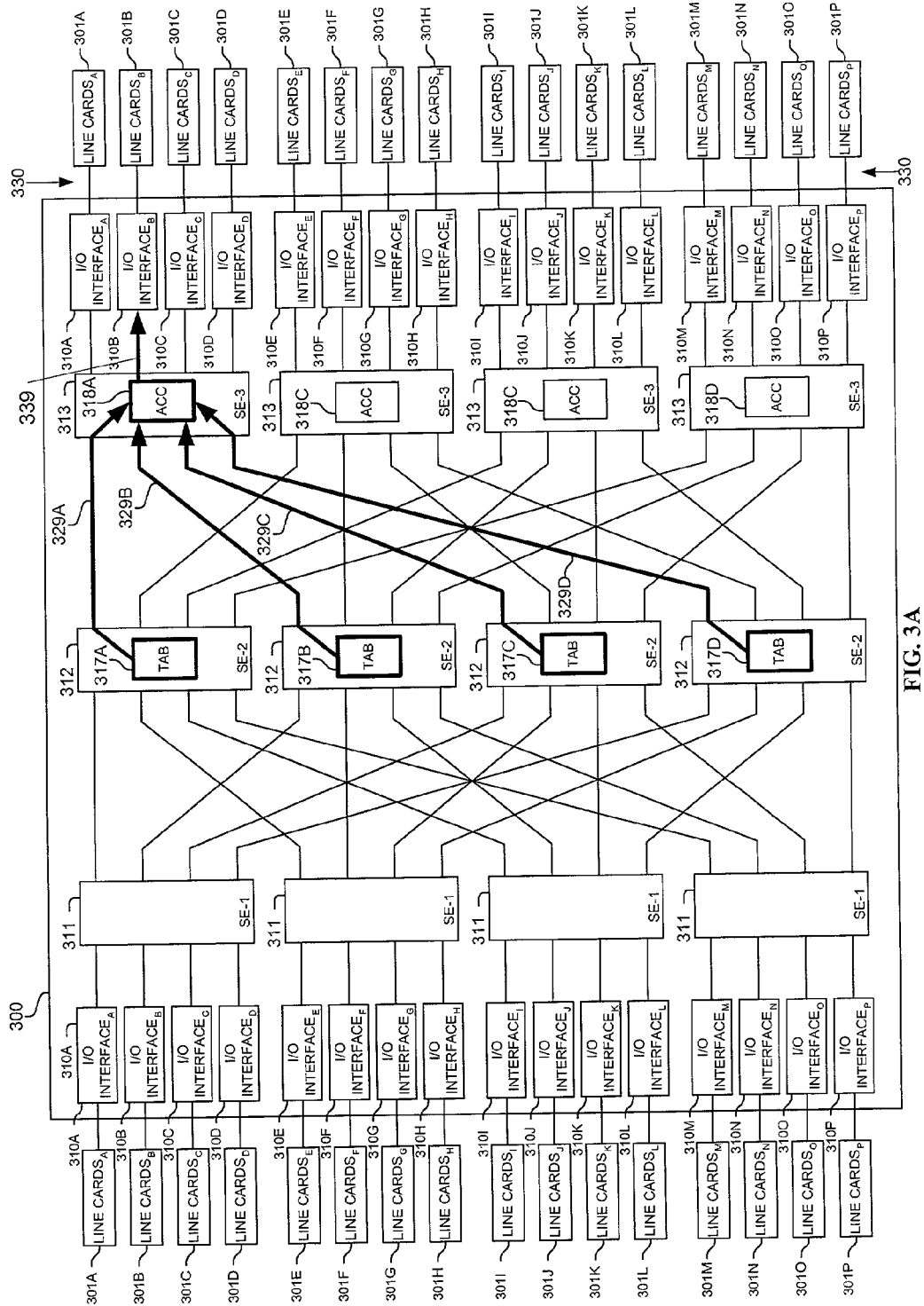
FIGS. 3A–B are block diagrams illustrating an exemplary accumulation and distribution of traffic and flow control messages based on traffic information collected in a routing stage switching element of a packet switching system.
Figure 3B:
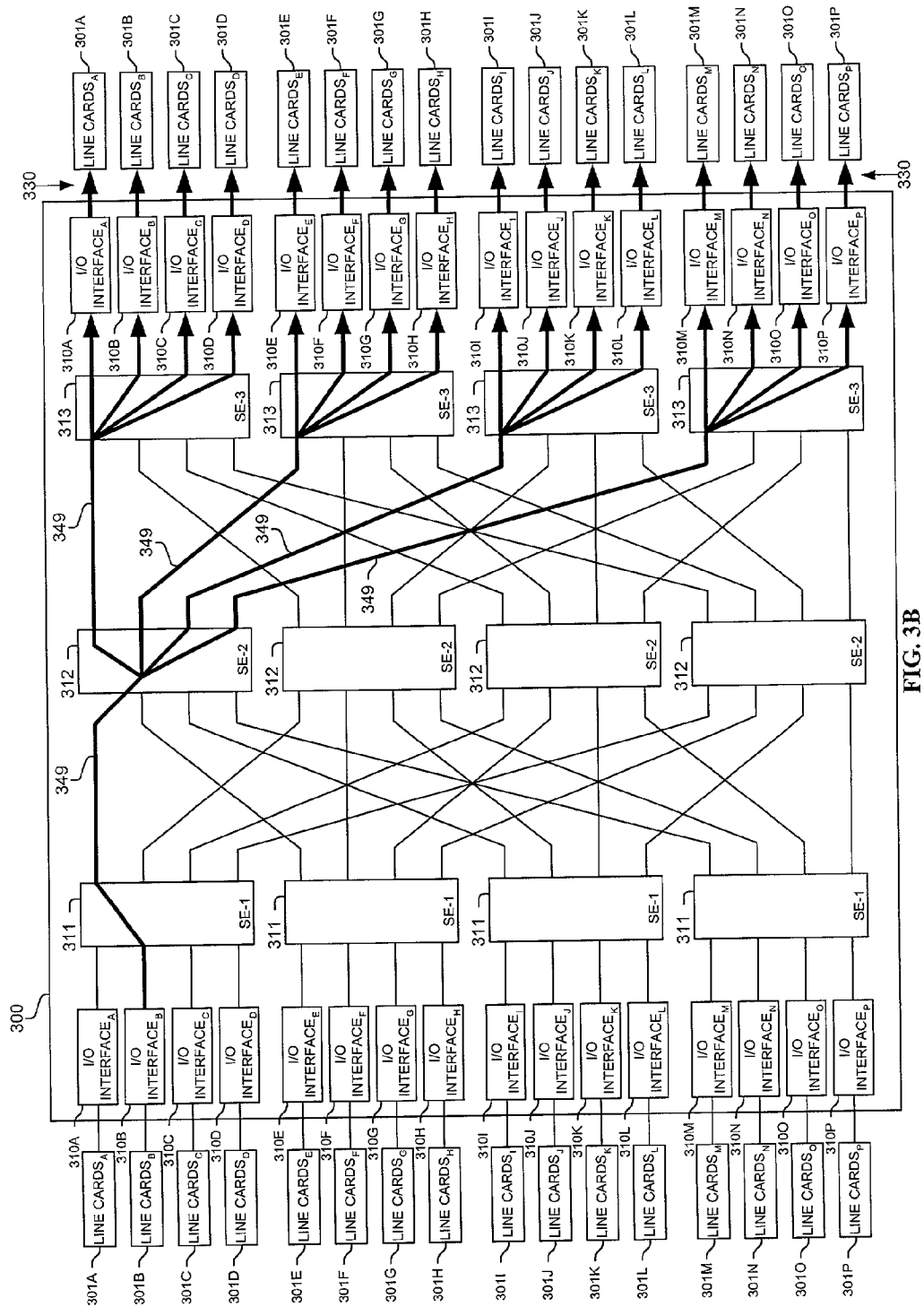

FIGS. 3A–B illustrate logical diagrams of the operation of an embodiment for collecting traffic information in tabulators, sending the collected traffic information to an accumulator, and distributing the collected flow control information to all (or a subset thereof) line cards (or ports thereof). Traffic is generally distributed across components, and/or planes of a packet switching system. For certain embodiments of packet switching systems, it is advantageous to collect indications, especially the volume and possibly location, of the distributed traffic in the various elements of a packet switching system. When an element of a packet switching system (or in some external component such as an operations system) has received this information, it can detect and react to perceived or actual traffic conditions.

FIG. 3A illustrates the one of many embodiments for collecting traffic information and generating flow control signals for a packet switching system having multiple line cards 301 each connected to an I/O interface 310. Note, the topology illustrated in FIG. 3A is that of a folded packet switch, and that each line card 301 and P/O interface 310 are shown both on the left and right side of FIG. 3A for simplicity of illustration. Also, switch elements SE-1 311 and SE-3 313 are illustrated separately; however in certain embodiments such as that illustrated in FIG. 1C, these are embodied in the same component. Moreover, other embodiments employ a different packet switch topology, such as, but not limited to a non-folded network, which provides some mechanism to convey flow control information from the output or egress portion of the packet switch back to the ingress portion.

In one embodiment as illustrated in FIGS. 3A–B, traffic information is collected by tabulators 317A–D within switching elements 312 of packet switch 300. As shown, switching elements 312 are part of the routing stage of packet switch 300. Tabulators 317A–D maintain a traffic data structure containing information to characterize the traffic level within the particular switching element. In one embodiment, each tabulator 317A–D maintains a traffic data structure to keep a count for each destination of packets within the particular switching element 312. Periodically or asynchronously, this collected traffic information is transmitted over links 329A–D to accumulators (ACC) 318A–D within next stage switching elements 313. For simplicity of illustration, traffic information in this example is shown as being sent to only one accumulator 318A, where in this and/or other embodiments, traffic information is sent to one or more accumulators 318A–D. Accumulators 318A–D maintain a data structure to accumulate the received traffic information. This accumulated information is periodically or asynchronously manipulated to determine actual, perceived or anticipated traffic conditions. Flow control information is then transmitted as illustrated by highlighted path 339 and continues over highlighted path 349 as illustrated in FIG. 3B. This flow control information can be distributed to all potential sending elements, internal or external to packet switch 300. As shown for illustrative purposes in FIG. 3B, the flow control information is broadcast to all I/O interfaces 310A–P and Line Cards 301A–P over the highlighted links. In this manner, traffic information is collected and accumulated from elements distributed within a packet switching system, with flow control messages being generated and sent to sending sources in response to the traffic conditions.

Figure 4:
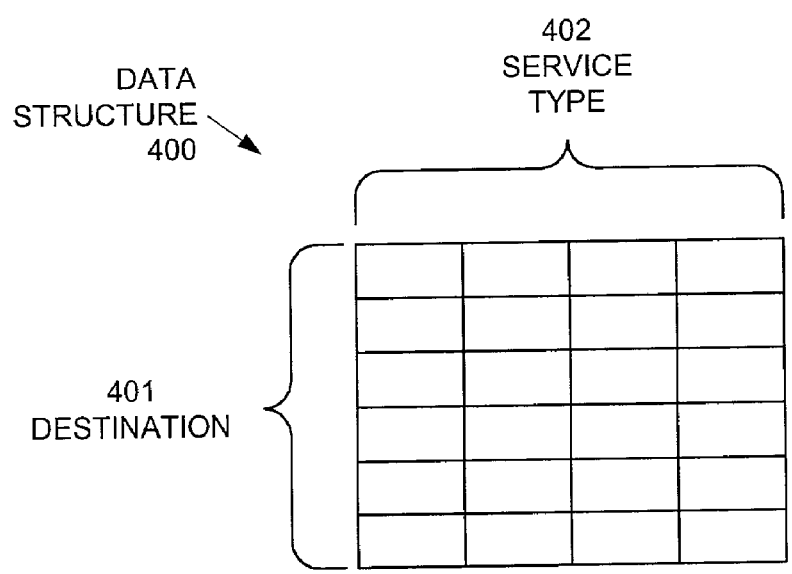
FIG. 4 is an exemplary data structure used to store flow control information.

FIG. 4 illustrates a data structure 400 for storing traffic and/or flow control information. Data structure 400 comprises a table having an entry for each destination (e.g., P/O interface, line card, or port of a line card, etc.) and for each type of service supported by the packet switching system. Certain embodiments do not make a distinction between service types or only have a single class of service. As shown, data structure 400 has columns 402 corresponding to service types and rows 401 corresponding to each of the destinations, typically but not always internal to the switching system. An entry within data structure 400 is typically an integer corresponding to a packet count, although it could be another indication of traffic and/or flow control information.

Figure 5A:
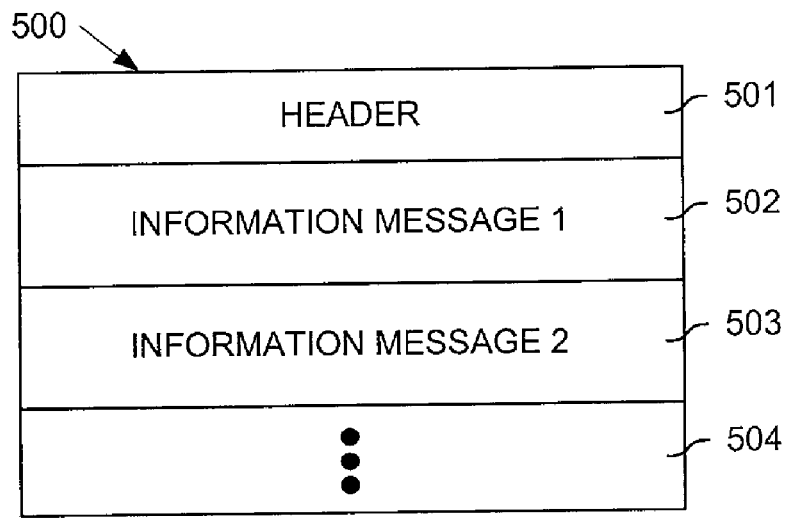
FIGS. 5A–B illustrate two exemplary packet formats and corresponding data structures that may be used in accumulating and distributing flow control information.
Figure 5B:
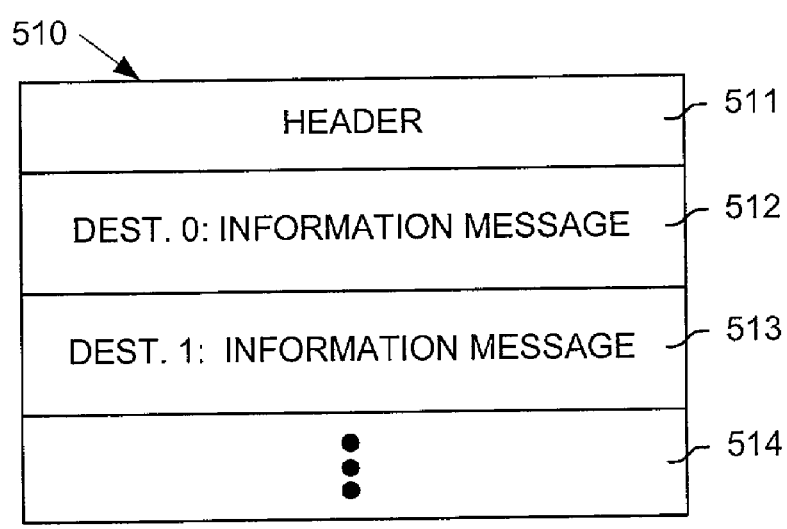

FIGS. 5A–B illustrate various formats of a data structure used by various embodiments for collecting and distributing traffic and/or flow control information. FIGS. 5A–B illustrate the packet format, in which the data payload (e.g., the data fields) of the packets also illustrate a possible embodiment of the data structure (e.g., queue, stack, array, hash table) used to collect the flow control information. FIG. 5A shows one embodiment of a packet 500 having a header 501 and multiple data fields 502–504, where each data field contains an information (i.e., traffic or flow control) message. FIG. 5B shows one embodiment of a packet 510 having a header 511 and multiple data fields 512–514, where each data field contains an information (i.e., traffic or flow control) message. This embodiment uses an array of flow control messages where each data field includes the flow control information at a position within the packet (or data structure) corresponding to the source of the information. For example, data field 512 corresponds to destination 0, data field 513 corresponds to destination 1, etc.

Figure 6:
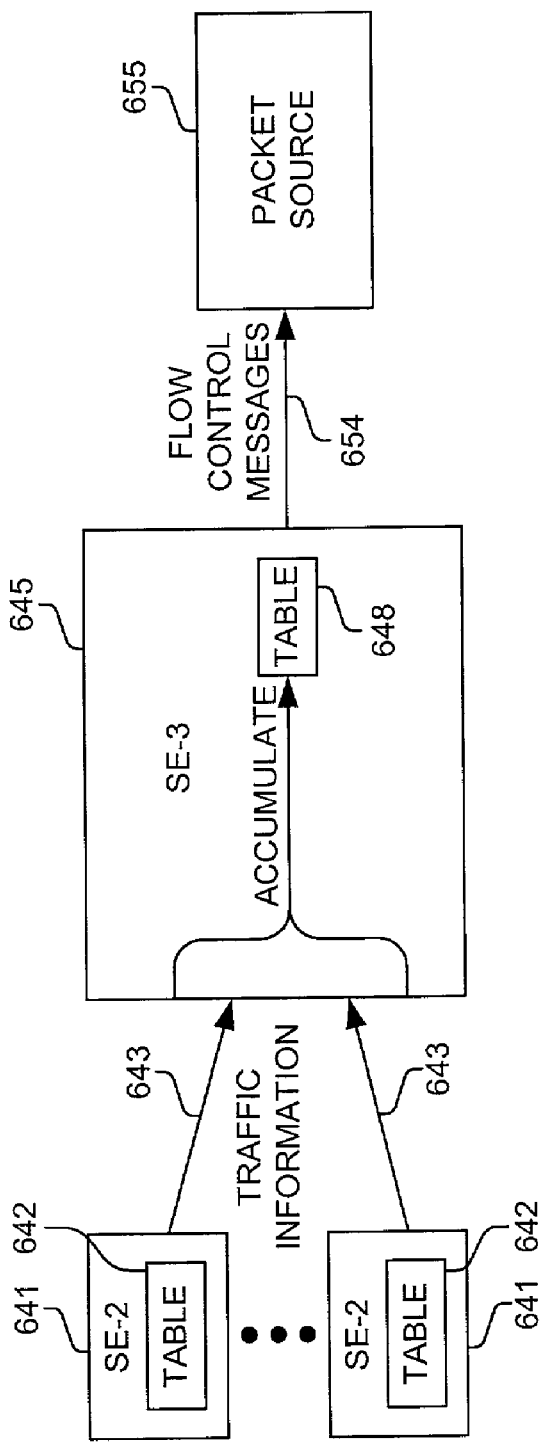
FIG. 6 is a flow diagram of the operation of an embodiment for accumulating and distributing flow control information.

The collection and accumulation of traffic information and distribution of flow control information is further illustrated in FIG. 6. Starting with the left of the diagram, traffic information is collected in a data structure 642 within the various SE-2 switching elements 641. Periodically or asynchronously, collected traffic information is transmitted in messages 643 to one or more SE-3 switching elements 645 where the traffic information is accumulated into data structure 648. Periodically, asynchronously, or in response to a change in a congestion or non-congestion condition, flow control messages 654 are sent to one or more packet sources 655. In response to receiving flow control messages, packet sources 655 can reduce or stop sending packets for a duration until the identified actual or potential congestion condition no longer exists. One or more of numerous techniques may be used to identify a congestion or non-congestion condition, such as thresholding the packet counts or a weighted set of value applied to the packet counts or other information stored in data structure 648.

Figure 7A:
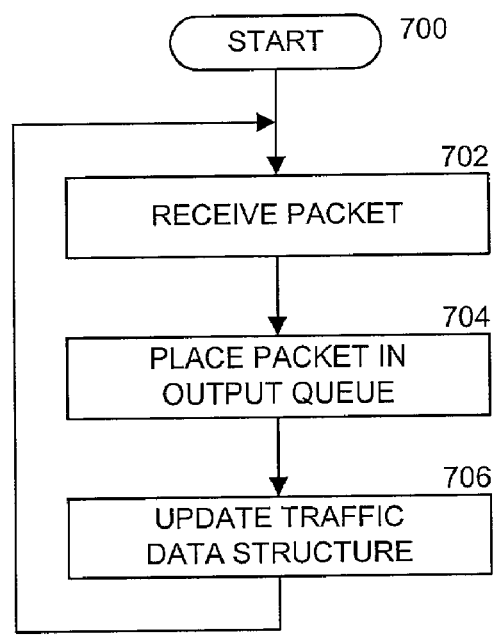
FIGS. 7A–C are flow diagrams for collecting/tabulating and distributing traffic information.
Figure 7B:
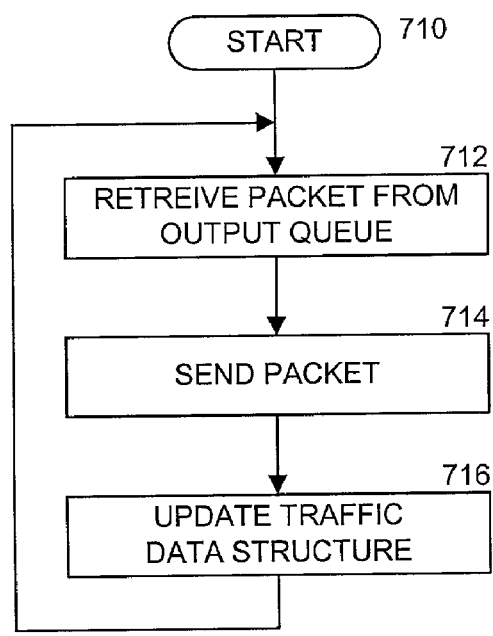

The flow diagrams of FIGS. 7A–B illustrate one of numerous embodiments for collecting and accumulating traffic information for packets within an element. Processing of FIG. 7A begins with process block 700, and proceeds to process block 702 where a packet is received. Next, in process block 704, the packet (or some indication or pointer thereof) is placed in an output queue. Next, in process block 706, the traffic data structure is updated to reflect the increase in the traffic level in the particular component of the packet switch. Typically, a packet count is maintained for each possible destination within the packet switch. Processing then returns to process block 702.

FIG. 7B illustrates one embodiment for updating the traffic data structure based on a decrease in the level of traffic within a component of the packet switch. Processing begins at process block 710, and proceeds to process block 712 where a packet (or some indication or pointer thereof) is retrieved and possibly placed in a transmit queue. Next, in process block 714, the packet is sent. Then, in process block 716, the traffic data structure is updated to reflect the decrease in the traffic level in the particular component of the packet switch. Processing then returns to process block 712.

Figure 7C:
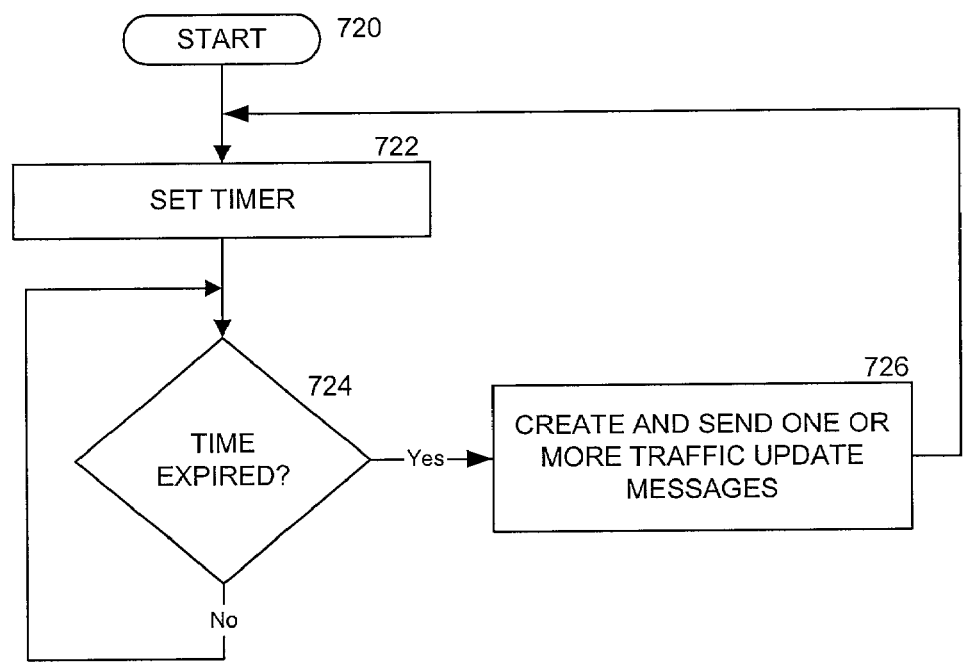

FIG. 7C illustrates one of numerous embodiments for periodically distributing traffic information. Other embodiments may employ some threshold or polling technique. Processing begins at process block 720, and proceeds to process block 722 where a timer is set. When the timer has expired as represented by the looping at process block 724, process block 726 is performed to create and send one or more traffic update messages to another component of the packet switching system. Processing then returns to process block 722.

Figure 8:
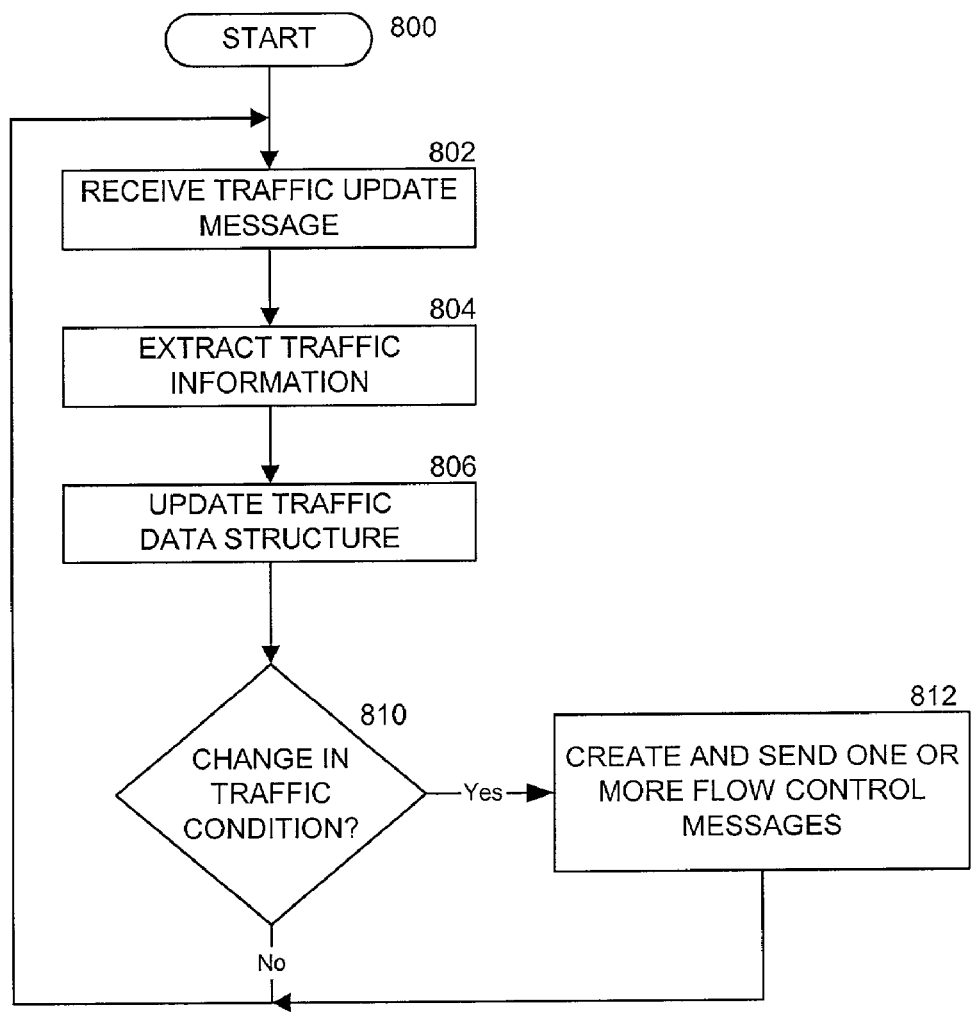
FIG. 8 is a flow diagram for accumulating traffic information and for distributing flow control messages.

FIG. 8 illustrates one of numerous embodiments for accumulating traffic information from one or more sources, recognizing changes in traffic conditions, and transmitting flow control signals or messages. Processing begins at process block 800, and proceeds to process block 802 where a traffic update message is received, typically from another component of the packet switch. Next, in process block 804, the traffic information is extracted, and in process block 806, the traffic data structure is updated. Next, as determined in process block 810, if a change in a traffic condition is detected, then in process block 812, one or more a flow control messages are created and sent, typically to the sources of traffic to indicate stop, decrease, or start sending traffic. Processing then returns to process block 802.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method comprising:
    each of a plurality of first elements of a packet switching system collecting information representing approximately a volume of traffic contained within itself;
    each of the plurality of first elements transmitting an indication of a subset of its said collected information to a second element of the packet switching system;
    the second element receiving said transmitted indications from said first elements; and
    the second element manipulating said received indications to determine a set of traffic conditions.

2. The method of claim 1, wherein the first and second elements include switching elements of the packet switching system.

3. The method of claim 1, wherein said collecting information by each of the plurality of first elements of the packet switching system includes maintaining a data structure indicating a traffic volume for each destination.

4. The method of claim 3, wherein each said destination is an I/O interface, a line card, a port, or other component of the packet switching system.

5. The method of claim 3, wherein the set of traffic conditions includes a destination traffic condition for each said destination.

6. The method of claim 5, wherein each destination is an I/O interface, a line card, a port, or other component of the packet switching system.

7. The method of claim 1, wherein the set of traffic conditions includes a destination traffic indication for each destination connected to the second element.

8. The method of claim 1, wherein a routing stage of the packet switching system includes each of the plurality of first elements.

9. The method of claim 1, wherein a final switching stage of the packet switching system includes the second element.

10. The method of claim 1, comprising the second element distributing an indication of a traffic condition from the determined set of traffic conditions.

11. The method of claim 10, wherein the determined set of traffic conditions are distributed to one or more components within the packet switching system providing traffic to a switching fabric of the packet switching system.

12. The method of claim 10, wherein the determined set of traffic conditions are distributed to one or more components external to the packet switching system.

13. A packet switching system comprising:
    a plurality of first components, each of the first components including a tabulator configured to maintain one or more quantities of packets located within the particular first component; and
    a plurality of second components, each of the second components connected to each of the plurality of first components, each of the plurality of second components including an accumulator configured to receive indications of said quantities of packets from said plurality of first components and to manipulate said received indications of said quantities of packets in order to determine conditions of traffic within the packet switching system.

14. The packet switching system of claim 13, wherein each of the first and second components include switching elements.

15. The packet switching system of claim 13, wherein each of the plurality of second components includes a distribution mechanism for distributing indications of the determined traffic conditions.

16. The packet switching system of claim 15, wherein one or more flow control messages sent by one of the plurality of second components includes one or more of said indications of the determined traffic conditions.

17. The packet switching system of claim 15, wherein each of the first and second components are switching elements.

18. A packet switching system comprising:
   means for tabulating traffic information in a first switching element of the packet switching system;
   means for forwarding indications of the tabulated traffic information from the first switching element to a second switching element;
   means for accumulating traffic information in the second switching element; and
   means for distributing from the second switching element to a third element of the packet switching system one or more flow control indications based on the accumulated traffic information.

19. The packet switching system of claim 18, wherein a final switching stage of the packet switching system includes the second switching element.

20. The packet switching system of claim 18, wherein a final switching stage of a switching fabric of the packet switching system includes the second switching element.

21. The packet switching system of claim 18, wherein said traffic information includes packet counts.

22. The method of claim 1, wherein said information includes statistical information representing approximately the volume of traffic contained within the particular said first element.

23. The method of claim 1, wherein said information includes packet counts.

24. The method of claim 23, wherein the subset of said collected information includes a subset of the collected packet counts.

25. The packet switching system of claim 18, wherein said traffic information does not include flow control information.

* * * * *

UNITED STATES PATENT AND TRADEMARK OFFICE
CERTIFICATE OF CORRECTION

| | | |
|---|---|---|
| PATENT NO. | : 7,027,397 B1 | Page 1 of 1 |
| APPLICATION NO. | : 09/784787 | |
| DATED | : April 11, 2006 | |
| INVENTOR(S) | : Turner et al. | |

It is certified that error appears in the above-identified patent and that said Letters Patent is hereby corrected as shown below:

Col. 4, line 63, replace "213" with -- 2B --

Col. 7, line 46, replace "301 each" with -- 301, each --

Col. 7, line 48, replace "P/O" with -- I/O --

Col. 8, line 26, replace "P/O" with -- I/O --

Signed and Sealed this

Nineteenth Day of December, 2006

JON W. DUDAS
*Director of the United States Patent and Trademark Office*